United States Patent [19]
Yuen

[11] Patent Number: 5,539,391
[45] Date of Patent: Jul. 23, 1996

[54] REMOTE CONTROLLER FOR CONTROLLING TURNING APPLIANCES ON AND OFF

[75] Inventor: Henry C. Yuen, Redondo Beach, Calif.

[73] Assignee: Gemstar Development Corporation, Pasadena, Calif.

[21] Appl. No.: 310,937

[22] Filed: Sep. 22, 1994

[51] Int. Cl.⁶ .................................................. G05B 19/02
[52] U.S. Cl. ............................. 340/825.72; 340/825.24; 340/825.25; 340/825.220; 358/335; 348/734
[58] Field of Search .................... 340/825.72, 825.24, 340/825.22; 348/734, 335; 307/141; 359/148

[56] References Cited

U.S. PATENT DOCUMENTS

| | | | |
|---|---|---|---|
| 4,109,239 | 8/1978 | Davis | 340/539 |
| 4,631,601 | 12/1986 | Brugliera | 358/335 |
| 4,780,910 | 10/1988 | Huddleston et al. | 455/617 |
| 4,885,775 | 12/1989 | Lucas | 380/10 |
| 4,890,321 | 12/1989 | Seth-Smith et al. | 380/20 |
| 4,896,102 | 1/1990 | DuBois | 324/77 B |
| 4,991,011 | 2/1991 | Johnson et al. | 358/141 |
| 5,038,401 | 8/1991 | Inotsume | 348/734 |
| 5,099,348 | 3/1992 | Huddleston et al. | 359/143 |
| 5,153,580 | 10/1992 | Pollack | 340/825.25 |
| 5,170,159 | 12/1992 | Kawabata et al. | 340/825.22 |
| 5,239,540 | 8/1993 | Rovira et al. | 370/77 |
| 5,251,324 | 10/1993 | McMullan, Jr. | 455/2 |
| 5,282,028 | 1/1994 | Johnson et al. | 358/86 |
| 5,410,326 | 4/1995 | Goldstein | 348/734 |
| 5,420,647 | 5/1995 | Levine | 348/734 |
| 5,438,377 | 8/1995 | Chang | 340/825.72 X |
| 5,481,251 | 1/1996 | Buys et al. | 340/825.72 X |
| 5,481,256 | 1/1996 | Darbee et al. | 340/825.72 X |

FOREIGN PATENT DOCUMENTS

| | | | |
|---|---|---|---|
| 61-77437 | 4/1986 | Japan | 359/148 |
| 61-246949 | 11/1986 | Japan | 340/825.72 |
| 62-262598 | 11/1987 | Japan | 359/148 |

Primary Examiner—Michael Horabik
Assistant Examiner—William H. Wilson Jr.
Attorney, Agent, or Firm—Christie, Parker & Hale

[57] ABSTRACT

Methods and apparatus are provided for controlling turning on and off appliances. The method for operating a remote controller includes the steps of selecting a first one of a plurality of appliances including a television to control, selecting to send a power toggle command, measuring a time between a user selecting a first one of a plurality of appliances to control and the user selecting to send a power toggle command, comparing the measured time to a predetermined time, and sending the power toggle command to the television, if the measured time is greater than the predetermined time, otherwise, if the measured time is less than the predetermined time, sending the power toggle command to the selected first one of a plurality of appliances to control.

30 Claims, 7 Drawing Sheets

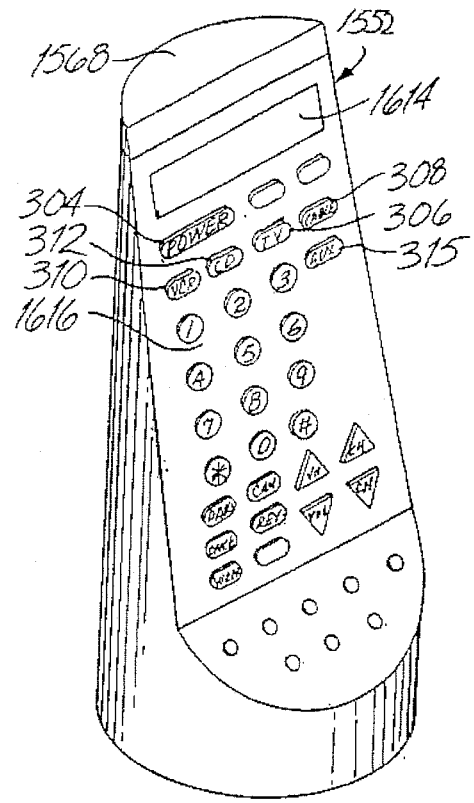
Fig.3
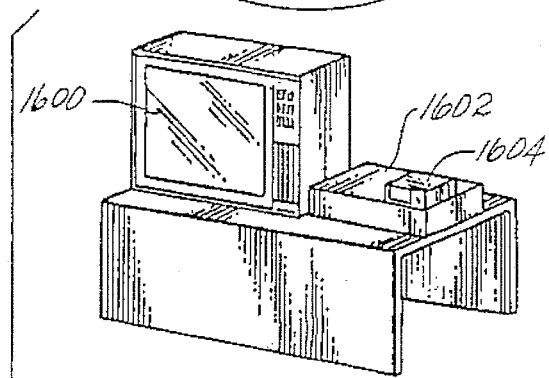
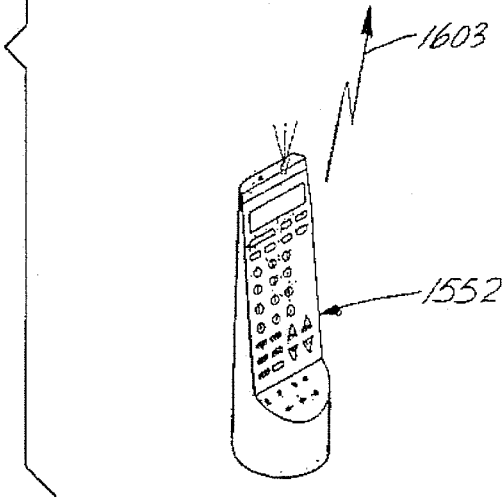
Fig.4

REMOTE CONTROLLER FOR CONTROLLING TURNING APPLIANCES ON AND OFF

BACKGROUND OF THE INVENTION

1. Field of the Invention

This invention relates to universal remote controllers for controlling appliances and particularly to apparatus and methods for controlling turning on and off appliances.

2. Description of the Related Art

A universal remote controller usually requires a user to select which device to control, before pressing buttons to send commands to the device. For example, the user may select to control a television. Then when the user selects channel up or channel down on the universal remote controller, the channel on the television will change accordingly. If the user selects to control a cable box, then the same channel up and channel down selections on the keyboard of the universal remote controller will result in the channel changing on the cable box. Usually once the user selects a device for the universal remote control to control, such as a video cassette recorder (VCR), then the remote controller will stay in the mode of controlling the VCR until the user selects to control another device by pressing the appropriate appliance select key on the keypad of the universal remote controller.

When the user is using the universal remote controller for turning on or off appliances, it is particularly important that the universal remote controller be in the proper mode so that the correct appliance is turned on or off. As described before, the universal remote control is placed in a particular mode by selecting an appliance to control. For example, if the user wishes to turn power on to a television, the user presses the television select key and then the power key. Later if the user wishes to turn off power to a video cassette recorder then the user can press the VCR select key and then the power key.

If the user has cable and a cable box, the universal remote controller is typically in the cable mode during viewing, because the user needs to change channels using the cable box. When viewing is finished, the user typically desires to turn off the TV and leave the cable box on. However, since the universal remote controller is in the cable mode during viewing, often the power button is pushed while the universal remote controller is in the cable mode rather than the TV mode. When the cable box is turned off, the cable box output signal to the television will also be turned off and the television screen will turn to "snow." The user then will need to change the universal remote controller to the television mode by pressing the television select key and then turn off the television, by pressing the power key. In this case, when the user wishes to view television again, and to view a channel that is on cable, then the user has to turn on both the television and the cable box which entails extra steps, rather than just turning on the television.

In some cable boxes when the power is turned off on the cable box then power is turned off to the television as well. In this case, if the user forgets that the universal remote controller is in the cable mode and inadvertently turns off power to the cable box when the user wishes to turn off power to the television, then the cable box will be turned off which will result in the television being turned off as well. This is the result that the user actually wished to occur and the user may not notice that the cable box has also been turned off. In either case, there is a high likelihood that the mistake of turning off the power on the cable box is not corrected until the next viewing. In addition to the inconvenience of turning on the television as well as the cable box, there is a danger that a VCR connected to the cable box is programmed to record a program received via the cable box. If the cable box is off then the program will not be recorded.

Accordingly, there is a need in the art for apparatus and methods for controlling turning on and off appliances which overcome the foregoing shortcomings.

SUMMARY OF THE INVENTION

According to the invention, methods and apparatus are provided for controlling turning on and off appliances. The method for operating a remote controller includes the steps of selecting a first one of a plurality of appliances including a television to control, selecting to send a power toggle command, measuring a time between a user selecting a first one of a plurality of appliances to control and the user selecting to send a power toggle command, comparing the measured time to a predetermined time, and sending the power toggle command to the television, if the measured time is greater than the predetermined time, otherwise, if the measured time is less than the predetermined time, sending the power toggle command to the selected first one of a plurality of appliances to control.

Many of the attendant features of this invention will be more readily appreciated as the same becomes better understood by reference to the following detailed descriptions and considered in connection with the accompanying drawings in which like reference symbols designate like parts throughout the figures.

BRIEF DESCRIPTION OF THE DRAWINGS

FIG. 3 is a drawing showing a universal remote controller according to the present invention;

FIG. 4 is a drawing showing a universal remote controller controlling a television, a cable box and a VCR according to the present invention;

DETAILED DESCRIPTION

Figure 1:
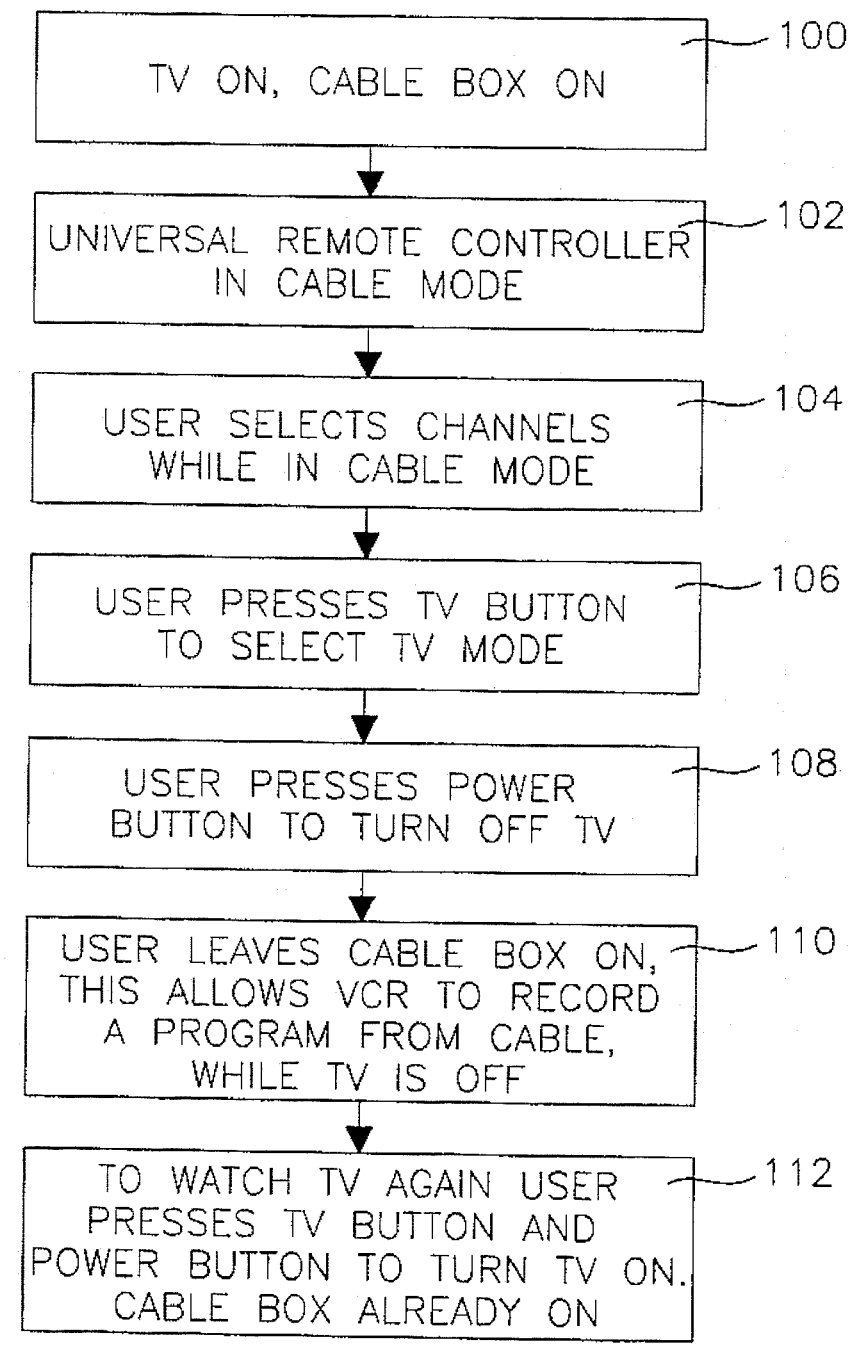
FIG. 1 is a flow diagram of a method for turning off a television using a universal remote controller that also controls a cable box.

Referring now to the drawings, FIG. 1 is a flow diagram of a method for using a universal remote controller to turn off a television, while leaving a cable box on. This flow diagram illustrates a method that is common in the prior art.

In step 100 it is assumed that the television and the cable box are both turned on. In step 102 it is assumed that the universal remote controller is in the cable mode. The universal remote controller is placed in the cable mode by pressing a button labeled CABLE on the universal remote controller. While in the cable mode the other buttons on the universal remote controller are used to send commands to a cable box. Typical commands that are sent are channel commands such as illustrated in step 104. The user can select a particular channel by entering the channel number or use channel up and down commands to change channels. Suppose the user is finished watching television, and then in step 106 the user presses a button labeled television to switch the universal remote controller to a TV mode. Then in step 108 the user presses the power button on the universal remote controller to turn the television off. In step 110 it is indicated that the user leaves the cable box on. This allows the VCR to record a program from the cable while the television is off. In step 112 it is illustrated that to watch TV again, the user presses the TV button and the power button to turn the television on. Since the cable box was never turned off, the cable box is already on and ready to be used.

Unfortunately, the method described in the flow diagram of FIG. 1 is sometimes inadvertently not followed, because the user inadvertently turns off the cable box when meaning to turn off the television. The result is that the cable box is not on and programs on cable cannot be recorded while the cable box is off.

Figure 2:
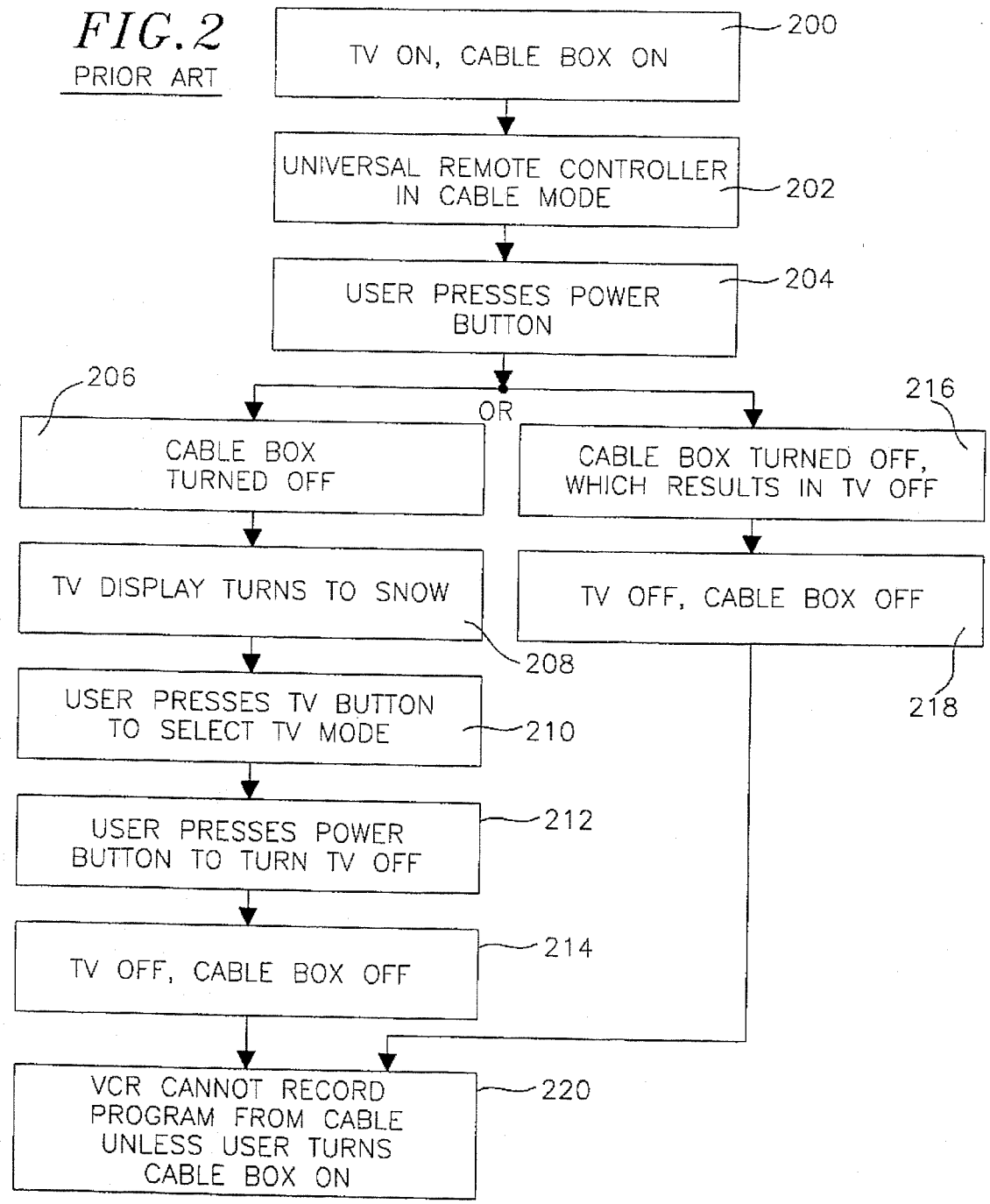
FIG. 2 is a flow diagram that illustrates a problem that occurs when using a universal remote controller for turning on and off a television.

FIG. 2 is a flow diagram that illustrates the problems that arise when the method illustrated in FIG. 1 is not followed. In step 200 it is assumed that the television and the cable box are turned on. Then in step 202 it is assumed that the universal remote controller is in the cable mode. Suppose the user presses the power button meaning to turn off the television, but presses the power button while the universal remote controller is in the cable mode as illustrated in step 204. There are two possibilities that occur when the user presses the power button when the universal remote controller is in the cable mode. The first possibility is that, as illustrated in steps 206 and 208, the cable box is turned off and the television display turns to a noisy display sometimes referred to as "snow." The snow on the TV display will alert the user to switch to the TV mode on the universal remote controller by pressing the TV button as illustrated in step 210. Then the user can press the power button on the universal remote controller to turn the TV off as illustrated in step 212. Now the television and the cable box are both turned off as illustrated in step 214. The result is that the VCR cannot record programs from cable unless the user turns the cable box on, as illustrated in step 220.

When a user presses the power button while the universal remote controller is in the cable mode, another possibility is that the cable box will be turned off and that the television will also be turned off, simultaneously, as illustrated in steps 216 and 218. This other possibility occurs on certain models of cable boxes and in particular on some Scientific Atlanta cable boxes. When the cable box and the television are turned off simultaneously the user is not alerted that the cable box has been turned off as in the case of steps 206 and 208 in which the television display turns to snow. When the cable box and the television turn off simultaneously, then the user believes that he has accomplished the desired result which is turning off the television. However, as illustrated in 220, the cable box is now off and the VCR cannot record a program from cable unless the user turns the cable box back on.

Whether the cable box turns off and the TV turns to snow as illustrated in steps 206 or 208 or whether the cable box and the television turn off simultaneously, as is illustrated in steps 216 and 218, the user in inconvenienced and a VCR that has been programmed to record programs from cable may not be able to record the programs. This invention provides a solution to these problems.

FIG. 3 is a diagram of a universal remote controller 1552 according to the present invention. The universal remote controller 1552 has a keypad 1616 that includes mode keys, such as VCR mode select key 310, CD mode select key 312, TV mode select key 306, CABLE mode select key 308, and AUX mode select key 315. The keypad also includes a power button 304. Also illustrated in FIG. 3 is display 1614 on universal remote controller 1552 and a IR transparent cover 1568 that covers infrared transmitters. Many of the features shown on the universal remote controller of FIG. 3 are common to many universal remote controllers. FIG. 4 illustrates the universal remote controller 1552 being used to control television 1600, VCR 1602 and cable box 1604. When keys are pressed on universal remote controller 1552 an IR transmission 1603 is sent to the appliances to control the appliance.

Figure 5:
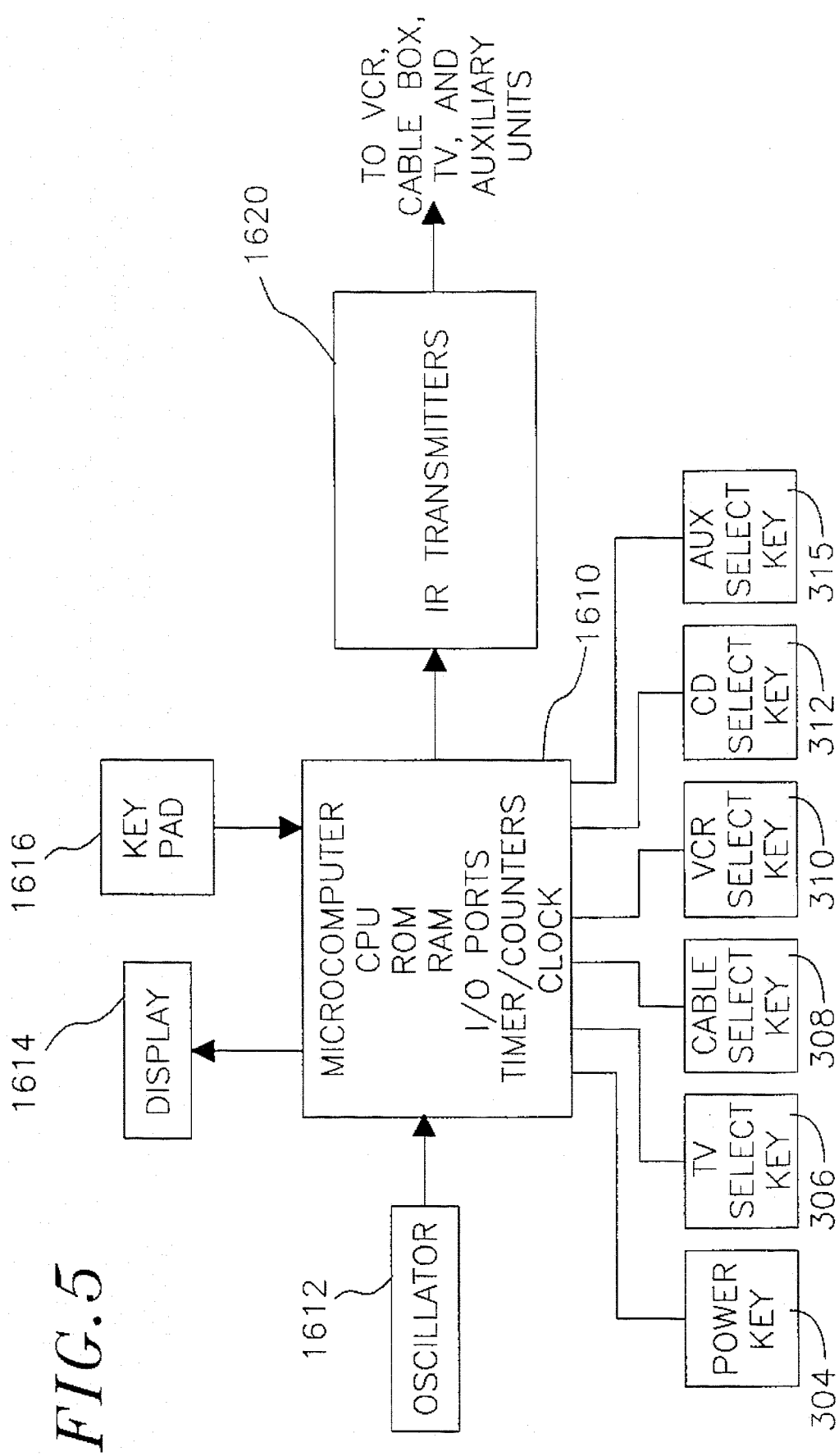
FIG. 5 is a block diagram of a universal remote controller according to the present invention.

FIG. 5 is a block diagram of a universal remote controller according to the present invention. As illustrated the universal remote controller contains a microcomputer 1610 that has interfaces to oscillator 1612, display 1614, keypad 1616 and IR transmitters 1620. As indicated above, the keypad 1616 includes power key 304, TV mode select key 306, cable mode select key 308, VCR mode select key 310, CD mode select key 312 and AUX mode select key 315.

The universal remote controller illustrated in FIG. 5 is controlled by a program stored in the ROM of microcomputer 1610. The program is responsive to the user pressing the various keys on the keypad, including the power key 304 and the various appliance mode select keys 306, 308, 310, 312 and 315. It is also possible that other appliance select keys could be provided on the universal remote controller. Also only one power key is illustrated on FIG. 3 and FIG. 5; however, rather than having a power key that toggles an appliance between on and off it is also possible to have a power on key and a power off key (not shown). For example, if only one power key is provided and the universal remote controller is in the TV mode, then when the power key 304 is pressed and the TV is off then the TV will be turned on, and then when the power key 304 is again pressed the TV will be turned off. If a power on key and a power off key are supplied then if the universal remote controller is in the TV mode and the TV is on and the power on key is pressed then the TV will remain on; however, if the TV off key is pressed then the TV will turn off.

The program stored in the ROM in microcomputer 1610 is responsive to the user pressing the power keys and the appliance mode select keys in the following manner. If the power key 304 is pressed, unless an appliance select key other than the TV select key 306 is pressed within a set time period of pressing the power key, then the command that is sent via IR transmitters 1620 is a television on/off toggle command. The set time period can be on the order of 5 seconds and the user can be provided with a means for adjusting this set time period. If an appliance select key such as the cable select key 308 is pressed within the set time period of pressing the power key, then the appliance on/off toggle command is transmitted and received by the appliance selected.

The advantage of this design of a universal remote controller is that even if the universal remote controller is in a cable mode a TV power command will be sent unless the user specifically indicates to send a power command to the cable box by pressing the cable select key within the set time period of pressing the power key. Thus, it is not possible for the user to inadvertently turn off the cable box when the user wants only to turn off the television.

Figure 6:
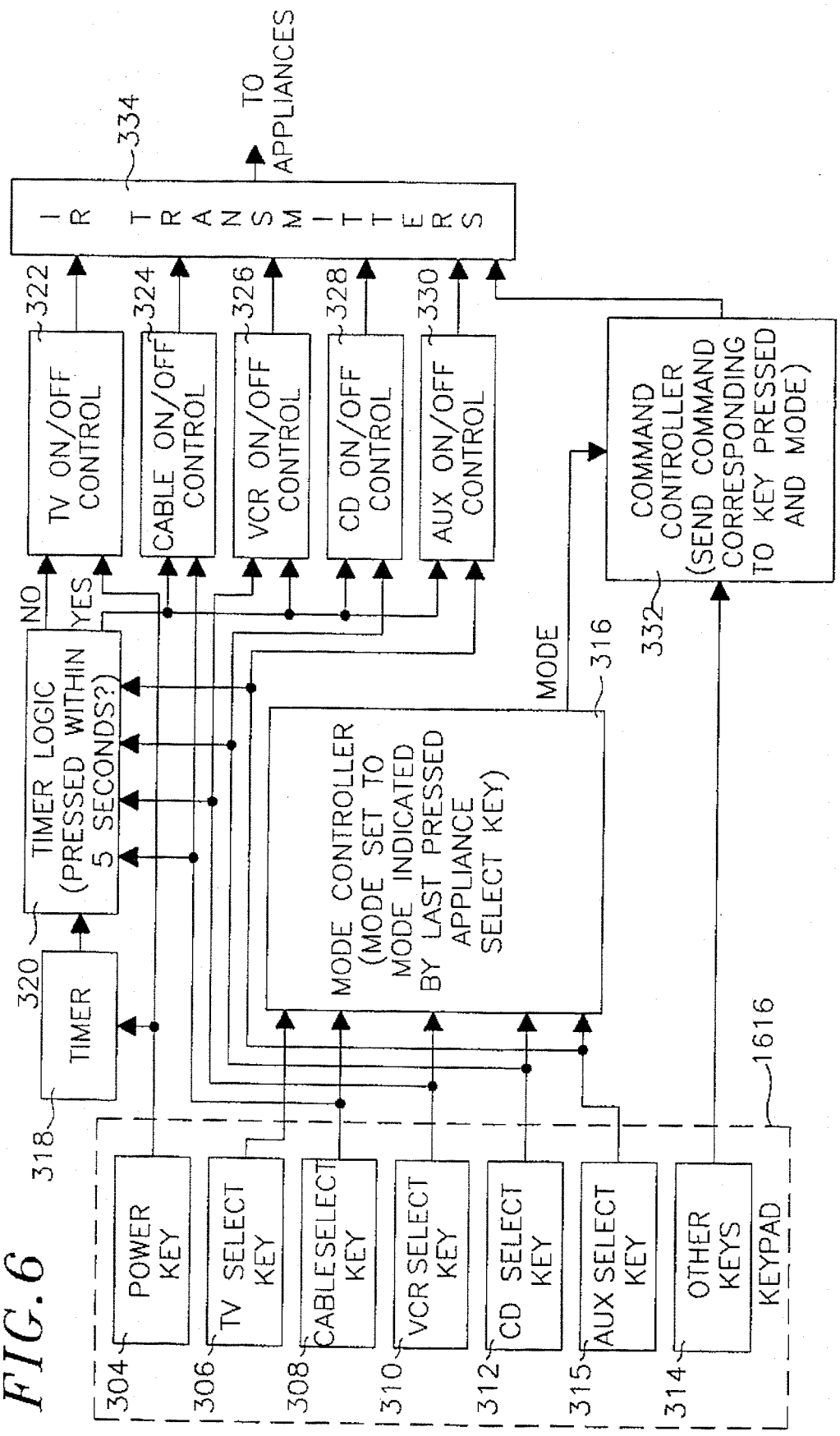
FIG. 6 is a block diagram of a portion of an universal remote controller for controlling the turning of appliances on and off according to the present invention.

FIG. 6 is a block diagram of a portion of a universal remote controller that can also be used to implement the control of turning on and off appliances according to the present invention. As shown in FIG. 6 the keypad 1616, is comprised of power key 304, TV mode select key 306, cable mode select key 308, VCR mode select key 310, CD mode select key 312, AUX mode select key 315 and other keys 314. The other keys are sent to command controller 332, which sends commands corresponding to keys pressed and the mode of the universal remote controller. The command controller 332 is coupled to the IR transmitters 334. The mode select keys 306, 308, 310, 312, and 315 are connected to mode controller 316, which sets the mode of the universal remote controller to the mode indicated by the last pressed appliance select key. The mode is an input to command controller 332. The power key 304 is coupled to timer 318, which has the function of timing the set time period, which was discussed above. The appliance select keys 306, 308 310, 312 and 315 are connected to timer logic 320. The timer 318 is also connected to timer logic 320, which has the function of determining whether an appliance select key has been pressed within the set time period of pressing the power key 304. If the timer logic indicates that the appliance select key has not been pressed within the set time period of pressing the power key, then a signal is sent to TV on/off control 332 which sends a signal via IR transmitters 334 to the television to turn on or off the television. Again the illustration in FIG. 6 is for a power key that acts as a power on/off toggle switch and it is possible to have a separate power on key and a separate power off key.

If the timer logic 320 determines that an appliance select key other than the TV select key has been pressed within the set time period of pressing the power key, then the timer logic sends a signal to cable on/off control 324, VCR on/off control 326, CD on/off control 328, and AUX on/off control 330. The outputs of these on/off controls are connected to IR transmitters 334. The on/off controls are also connected to the corresponding appliance select key. For example, cable select key 308 is coupled to cable on/off control 324. As an example of operation if the cable on/off control perceives a signal indicating the cable select key has been pressed and a signal from timer logic 320 that indicates the cable select key has been pressed within the set time period of the power key 304 being pressed, then the cable on/off control 324 will send a signal via IR transmitters 334 to the cable box to turn on or off the cable box. The other on/off controls such as VCR on/off control 326 operates in analogous manner.

The operation of the universal remote controller of FIG. 6 is such that the power to a cable box or a VCR will not be turned off unless the user selects the corresponding mode select key within a set time period of pressing the power key. This will prevent the user from inadvertently turning off the cable box or the VCR when the user intends to turn off the television. The implementations of the universal remote controller shown in FIG. 5 and FIG. 6 both prevent the problem illustrated by the flow graph of FIG. 2.

Figure 7:
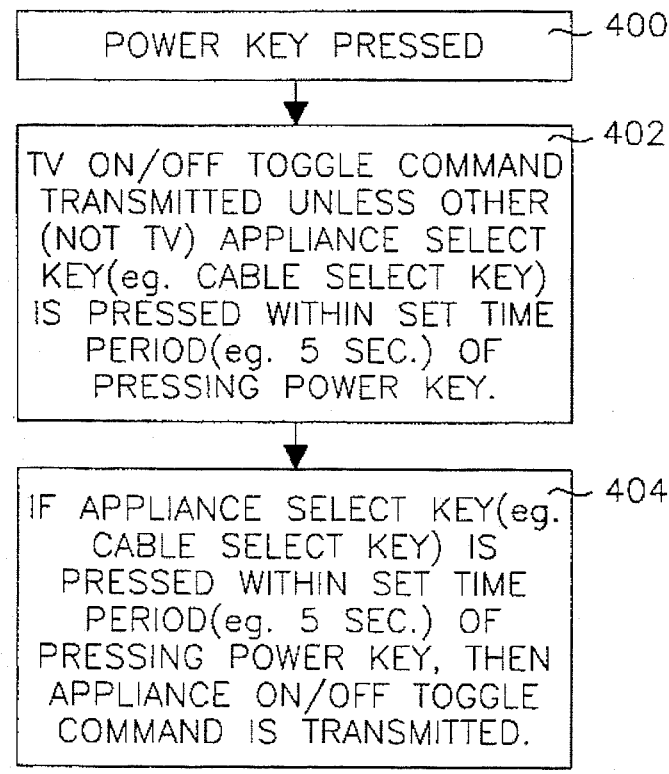
FIG. 7 is a flow diagram of a method for controlling the turning of appliances on and off according to the present invention.

FIG. 7 is a flow diagram of a method for controlling the turning of appliances on and off according to the present invention. In step 400 a power key on a universal remote controller is pressed. Then in step 402 a TV on/off toggle command is transmitted to the television unless another appliance select key, other than the TV select key is pressed within a set time period of pressing the power key. For example, as described above, the set time period could be five seconds. In step 404 if an appliance key such as the cable select key is pressed within the set time period of pressing the power key, then an appliance on/off toggle command is transmitted to the appliance.

Figure 8:
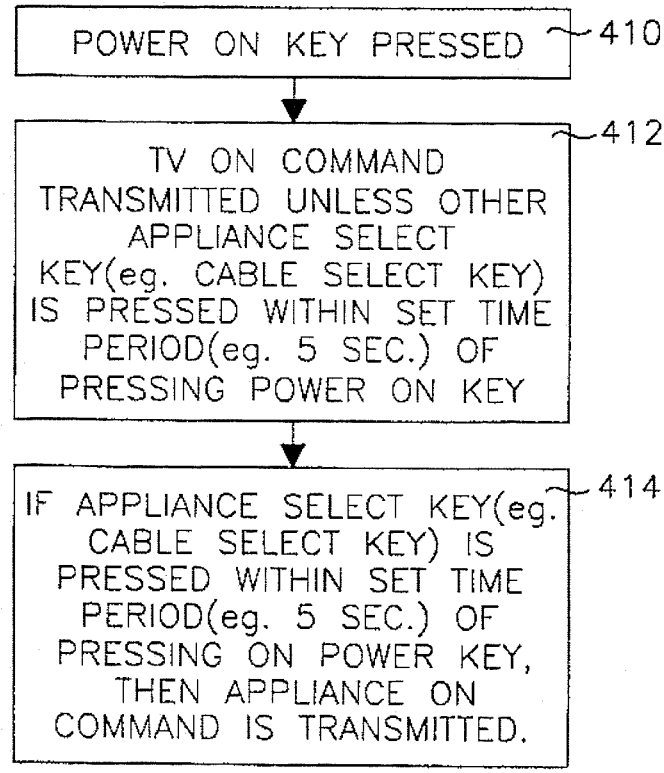
FIG. 8 is a flow diagram of a method for controlling the turning of appliances on according to the present invention.
Figure 9:
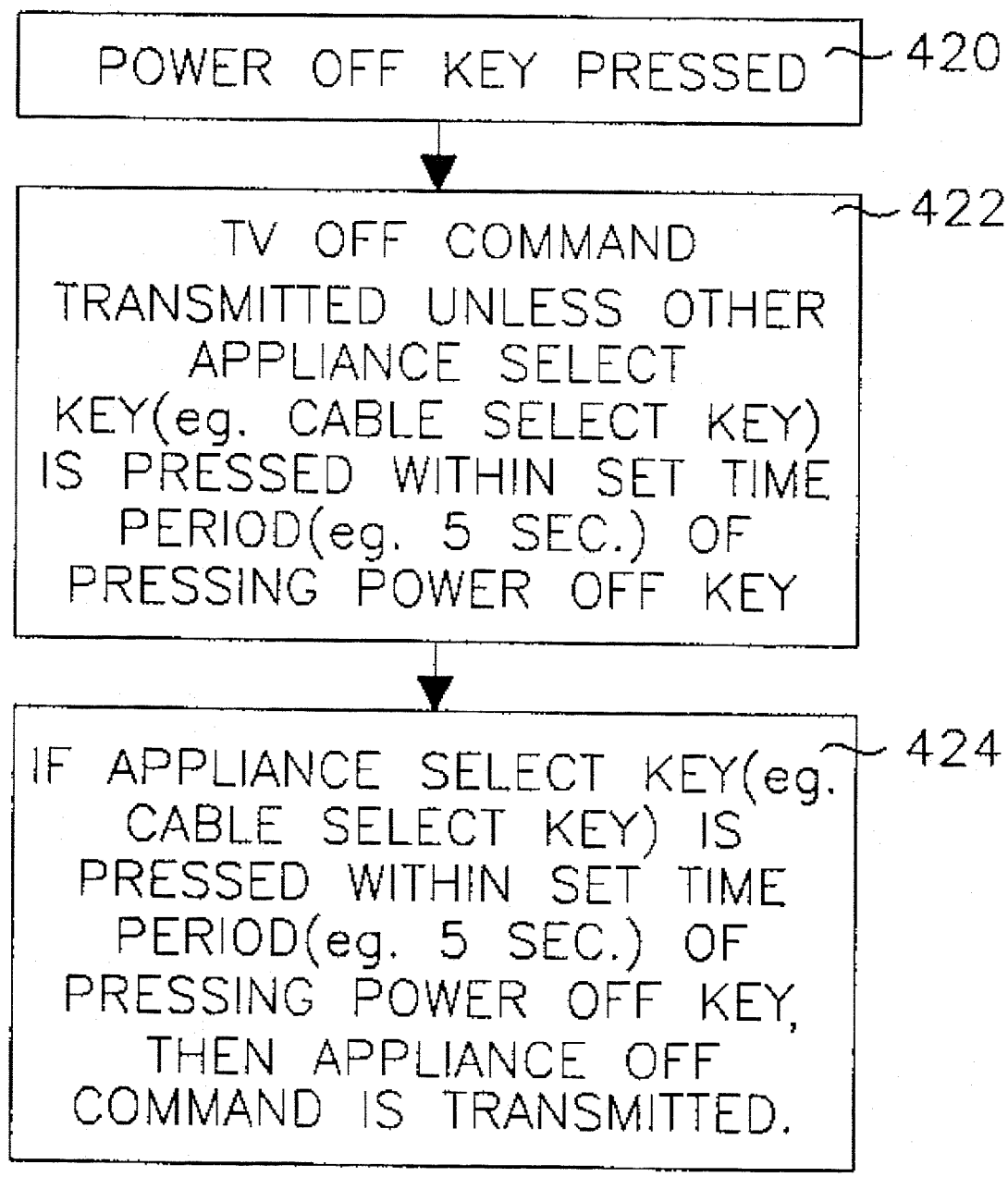
FIG. 9 is a flow diagram of a method for controlling the turning of appliances off according to the present invention.

FIGS. 8 and 9 are flow diagrams according to the present invention for controlling the turning of appliances on and off for the situation in which the universal remote controller has separate power on and power off keys. The methods illustrated in FIGS. 8 and 9 prevent a user from inadvertently turning an appliance on or off other than the television unless the user specifically indicates to turn on or off the appliance by pressing a mode select key within a set time period of pressing the power on or off key.

As illustrated in FIG. 8, in step 410 a power on key is pressed. In step 412 a TV on command is transmitted unless another appliance select key such as a cable select is pressed within a set time period of pressing the power on key. The set time period can be five seconds as indicated above. In step 414 if the appliance select key is pressed within the set time period of pressing the power on key, then the appliance on command is transmitted to the appliance.

In FIG. 9 a power off key is pressed in step 420. Then in step 422 a TV off command is transmitted to the television unless another appliance select key, such as a cable select key is pressed within a set time period of pressing the power off key. This prevents a user from inadvertently turning off a cable box or a VCR when intending to turn off the television. Then in step 424 if an appliance select key such as a cable select key is pressed within the set time period of pressing the power off key, then the appliance off command is transmitted to the appliance.

Thus, apparatus and methods have been described for controlling the turning of appliances on and off which reduce the risk that a user will inadvertently turn off a cable box or a VCR while using a universal remote controller, when a user really wishes to turn off a television and leave the cable box and the VCR on.

The described embodiments of the invention are only considered to be preferred and illustrative of the inventive concept, the scope of the invention is not to be restricted to such embodiments. Various and numerous other arrangements may be devised by one skilled in the art without departing from the spirit and scope of this invention.

It is therefore intended by the appended claims to cover any and all such applications, modifications and embodiments within the scope of the present invention.

What is claimed is:

1. A remote controller comprising:

first means for selecting a first one of a plurality of appliances including a television to control;

second means for selecting to send a power toggle command;

means for measuring a time between a user selecting a first one of a plurality of appliances to control using the first means for selecting and the user selecting to send a power toggle command using the second means for selecting;

means for comparing the measured time with a predetermined time; and means for sending the power toggle command to the television, if the measured time is greater than the predetermined time, otherwise, if the measured time is less than the predetermined time, sending the power toggle command to the selected first one of a plurality of appliances to control.

2. The remote controller of claim 1 wherein the first means for selecting a first one of a plurality of appliances including a television to control comprises a plurality of keys on the remote controller for selecting one of the appliances to control.

3. The remote controller of claim 1 wherein the second means for selecting to send a power toggle command comprises a power key on the remote controller.

4. The remote controller of claim 1 wherein the means for sending the power toggle command to the television, if the measured time is greater than a predetermined time, otherwise, if the measured time is less than the predetermined time, sending the power toggle command to the selected first one of a plurality of appliances to control comprises an infrared transmitter.

5. The remote controller of claim 4 wherein the predetermined time is approximately between 1 to 5 seconds.

6. A method for operating a remote controller comprising the steps of:

selecting a first one of a plurality of appliances including a television to control;

selecting to send a power toggle command;

measuring a time between a user selecting a first one of a plurality of appliances to control and the user selecting to send a power toggle command;

comparing the measured time to a predetermined time; and sending the power toggle command to the television, if the measured time is greater than the predetermined time, otherwise, if the measured time is less than the predetermined time, sending the power toggle command to the selected first one of a plurality of appliances to control.

7. The method of claim 6 wherein the step of selecting a first one of a plurality of appliances including a television to control comprises the step of selecting one of a plurality of keys on the remote controller for selecting one of the appliances to control.

8. The method of claim 6 wherein the step of selecting to send a power toggle command comprises the step of pressing a power key on the remote controller.

9. The method of claim 6 wherein the step of sending the power toggle command to the television, if the measured time is greater than a predetermined time, otherwise, if the measured time is less than the predetermined time, sending the power toggle command to the selected first one of a plurality of appliances to control comprises the step of sending the command via an infrared transmitter.

10. The method of claim 9 wherein the predetermined time is approximately between 1 to 5 seconds.

11. A remote controller comprising:

first means for selecting a first one of a plurality of appliances including a television to control;

second means for selecting to send a power ON command;

means for measuring a time between a user selecting a first one of a plurality of appliances to control using the first means for selecting and the user selecting to send a power ON command using the second means for selecting;

means for comparing the measured time with a predetermined time; and means for sending the power ON command to the television, if the measured time is greater than the predetermined time, otherwise, if the measured time is less than the predetermined time, sending the power ON command to the selected first one of a plurality of appliances to control.

12. The remote controller of claim 11 wherein the first means for selecting a first one of a plurality of appliances including a television to control comprises a plurality of keys on the remote controller for selecting one of the appliances to control.

13. The remote controller of claim 11 wherein the second means for selecting to send a power ON command comprises a power ON key on the remote controller.

14. The remote controller of claim 11 wherein the means for sending the power ON command to the television, if the measured time is greater than a predetermined time, otherwise, if the measured time is less than the predetermined time, sending the power ON command to the selected first one of a plurality of appliances to control comprises an infrared transmitter.

15. The remote controller of claim 14 wherein the predetermined time is approximately between 1 to 5 seconds.

16. A method for operating a remote controller comprising the steps of:

selecting a first one of a plurality of appliances including a television to control;

selecting to send a power ON command;

measuring a time between a user selecting a first one of a plurality of appliances to control and the user selecting to send a power ON command;

comparing the measured time to a predetermined time; and sending the power ON command to the television, if the measured time is greater than the predetermined time, otherwise, if the measured time is less than the predetermined time, sending the power ON command to the selected first one of a plurality of appliances to control.

17. The method of claim 16 wherein the step of selecting a first one of a plurality of appliances including a television to control comprises the step of selecting one of a plurality of keys on the remote controller for selecting one of the appliances to control.

18. The method of claim 16 wherein the step of selecting to send a power ON command comprises the step of pressing a power ON key on the remote controller.

19. The method of claim 16 wherein the step of sending the power ON command to the television, if the measured time is greater than a predetermined time, otherwise, if the measured time is less than the predetermined time, sending the power ON command to the selected first one of a plurality of appliances to control comprises the step of sending the command via an infrared transmitter.

20. The method of claim 19 wherein the predetermined time is approximately between 1 to 5 seconds.

21. A remote controller comprising:

first means for selecting a first one of a plurality of appliances including a television to control;

second means for selecting to send a power OFF command;

means for measuring a time between a user selecting a first one of a plurality of appliances to control using the first means for selecting and the user selecting to send a power OFF command using the second means for selecting;

means for comparing the measured time with a predetermined time; and means for sending the power OFF command to the television, if the measured time is greater than the predetermined time, otherwise, if the measured time is less than the predetermined time, sending the power OFF command to the selected first one of a plurality of appliances to control.

22. The remote controller of claim 21 wherein the first means for selecting a first one of a plurality of appliances including a television to control comprises a plurality of keys on the remote controller for selecting one of the appliances to control.

23. The remote controller of claim 21 wherein the second means for selecting to send a power OFF command comprises a power OFF key on the remote controller.

24. The remote controller of claim 21 wherein the means for sending the power OFF command to the television, if the measured time is greater than a predetermined time, otherwise, if the measured time is less than the predetermined time, sending the power OFF command to the selected first one of a plurality of appliances to control comprises an infrared transmitter.

25. The remote controller of claim 24 wherein the predetermined time is approximately between 1 to 5 seconds.

26. A method for operating a remote controller comprising the steps of:

selecting a first one of a plurality of appliances including a television to control;

selecting to send a power OFF command;

measuring a time between a user selecting a first one of a plurality of appliances to control and the user selecting to send a power OFF command;

comparing the measured time to a predetermined time; and sending the power OFF command to the television, if the measured time is greater than the predetermined time, otherwise, if the measured time is less than the predetermined time, sending the power OFF command to the selected first one of a plurality of appliances to control.

27. The method of claim 26 wherein the step of selecting a first one of a plurality of appliances including a television to control comprises the step of selecting one of a plurality of keys on the remote controller for selecting one of the appliances to control.

28. The method of claim 26 wherein the step of selecting to send a power OFF command comprises the step of pressing a power OFF key on the remote controller.

29. The method of claim 26 wherein the step of sending the power OFF command to the television, if the measured time is greater than a predetermined time, otherwise, if the measured time is less than the predetermined time, sending the power OFF command to the selected first one of a plurality of appliances to control comprises the step of sending the command via an infrared transmitter.

30. The method of claim 29 wherein the predetermined time is approximately between 1 to 5 seconds.

* * * * *